United States Patent [19]
Menzenski

[11] Patent Number: 5,765,395
[45] Date of Patent: Jun. 16, 1998

[54] PROCESS AND APPARATUS FOR RECOVERING VAPOR

[75] Inventor: Edward Menzenski, Prospect, Ky.

[73] Assignee: Jordan Holding Company, Fisherville, Ky.

[21] Appl. No.: 829,272

[22] Filed: Mar. 31, 1997

Related U.S. Application Data

[63] Continuation of Ser. No. 564,332, Dec. 11, 1995, Pat. No. 5,671,612, which is a continuation-in-part of Ser. No. 191,844, Feb. 4, 1994, Pat. No. 5,426,945.

[51] Int. Cl.⁶ .................................................. F25J 3/08
[52] U.S. Cl. ................... 62/611; 62/632; 62/636; 62/926; 62/908
[58] Field of Search .................. 62/611, 618, 632, 62/636, 908, 926

[56] References Cited

U.S. PATENT DOCUMENTS

| | | |
|---|---|---|
| 2,919,766 | 1/1960 | Dillman et al. . |
| 3,266,262 | 8/1966 | Moragne . |
| 3,320,756 | 5/1967 | Hashemi . |
| 3,714,790 | 2/1973 | Battey . |
| 3,771,317 | 11/1973 | Nichols . |
| 3,830,040 | 8/1974 | Hendrix . |
| 3,830,074 | 8/1974 | Nichols . |
| 3,867,111 | 2/1975 | Knowles . |
| 3,972,201 | 8/1976 | Datis . |
| 4,077,789 | 3/1978 | Edwards . |
| 4,110,996 | 9/1978 | Thompson . |
| 4,283,212 | 8/1981 | Graham et al. . |
| 4,343,629 | 8/1982 | Dinsmore et al. . |
| 4,350,018 | 9/1982 | Frank et al. . |
| 4,480,393 | 11/1984 | Flink et al. . |
| 4,569,207 | 2/1986 | James . |
| 4,670,028 | 6/1987 | Kennedy . |
| 4,682,549 | 7/1987 | Hall . |
| 4,715,868 | 12/1987 | Kennedy . |
| 5,006,138 | 4/1991 | Hewitt . |
| 5,076,822 | 12/1991 | Hewitt . |
| 5,176,002 | 1/1993 | O'Brien et al. . |
| 5,187,131 | 2/1993 | Tiggelbeck et al. . |
| 5,426,945 | 6/1995 | Menzenski . |
| 5,671,612 | 9/1997 | Menzenski ............................ 62/611 |

OTHER PUBLICATIONS

Service Bulletin 11, Excessive Carbon Bed Temperatures, H. Dinsmore; John Zink Company, Jul. 6, 1993.
Kappa Gi, Vapour Recovery Units; DWG 920-15; Date Unknown.

Primary Examiner—Christopher Kilner
Attorney, Agent, or Firm—King & Schickli

[57] ABSTRACT

A process and apparatus are provided for recovering volatile liquid vapors from an air-volatile liquid vapor mixture. The process includes: (1) cooling the mixture to condense volatile liquid vapors and moisture; (2) collecting the condensed volatile liquid vapors and moisture; (3) circulating the cooled and dehumidified mixture through a bed of adsorbent; and (4) desorbing and recovering the volatile liquids from the bed. The apparatus includes a refrigeration unit, a cooler for cooling the mixture, two reaction vessels each including a bed of adsorbent, a pump, an absorber tower and a valve and conduit system for circulating the mixture through the various components of the apparatus. Heat may be recovered from the refrigerant and used to heat the bed during desorption.

24 Claims, 3 Drawing Sheets

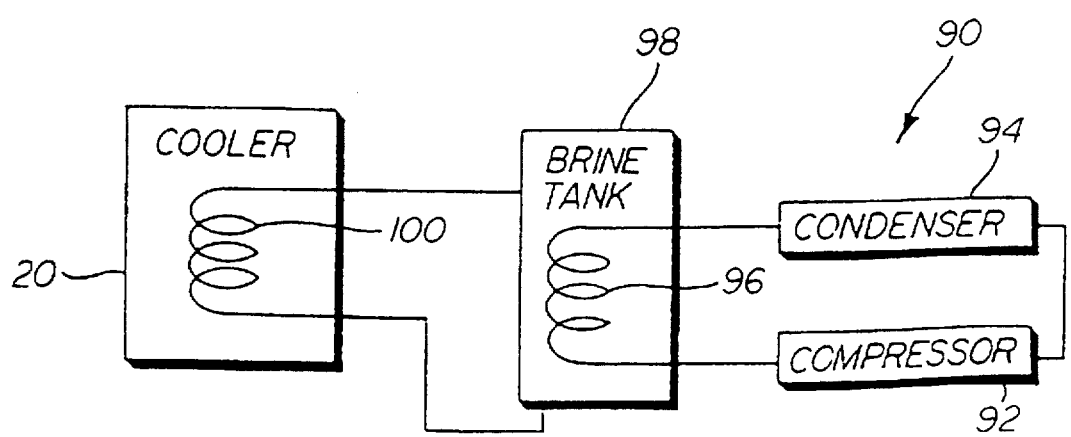

PROCESS AND APPARATUS FOR RECOVERING VAPOR

This is a continuation of U.S. patent application Ser. No. 08/564,332, filed Dec. 11, 1995, now U.S. Pat. No. 5,671,612, which is a continuation-in-part of U.S. patent application Ser. No. 08/191,844, filed Feb. 4, 1994 and issued as U.S. Pat. No. 5,426,945 on Jun. 27, 1995, entitled "Process and Apparatus for Recovering Vapor".

TECHNICAL FIELD

The present invention relates generally to a process and apparatus for recovering volatile liquids from air-volatile liquid vapor mixtures and, more particularly, to an improved process and apparatus for recovering vaporized hydrocarbons in the form of gasoline from an air-gasoline vapor mixture as is expelled from tank cars, trucks, ships, and the like during loading with gasoline.

BACKGROUND OF THE INVENTION

When handling volatile liquids such as hydrocarbons including gasoline and kerosene, air-volatile liquid vapor mixtures are readily produced. The venting of such air-vapor mixtures directly into the atmosphere results in significant pollution of the environment and a fire or explosion hazard. Accordingly, existing environmental regulations require the control of such emissions.

As a consequence, a number of processes and apparatus have been developed and utilized to recover volatile liquids from air-volatile liquid vapor mixtures. Generally, the removed volatile liquids are liquified and recombined with the volatile liquid from which they were vaporized thereby making the recovery process more economical.

The initial vapor recovery systems utilized in the United States in the late 1920's and early 1930's incorporated a process combining compression and condensation. Such systems were originally only utilized on gasoline storage tanks. It wasn't until the 1950's that local air pollution regulations began to be adopted forcing the installation of vapor recovery systems at truck loading terminals. Shortly thereafter, the "clean air" legislation activity of the 1960's, which culminated in the Clean Air Act of 1968, further focused nationwide attention on the gasoline vapor recovery problem. As a result a lean oil/absorption system was developed. This system dominated the marketplace for a short time.

Subsequently, in the late 1960's and early 1970's cryogenic refrigeration systems began gaining market acceptance (note, for example, U.S. Pat. No. 3,266,262 to Moragne). While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. In contrast, liquid nitrogen cooling systems provide more cooling than is required and are prohibitively expensive to operate for this type of application.

As a result of these shortcomings of cryogenic refrigeration systems, alternative technology was sought and adsorption/absorption vapor recovery systems were more recently developed. One such system is disclosed in, for example, U.S. Pat. No. 4,066,423 to McGill et al. Such systems utilize a bed of solid adsorbent selected, for example, from silica gel, certain forms of porous mineral such as alumina and magnesia, and most preferably activated charcoal. These adsorbents have an affinity for volatile hydrocarbon liquids. Thus, as the air-hydrocarbon vapor mixture is passed through the bed, a major portion of the hydrocarbons contained in the mixture are adsorbed on the bed. The resulting residue gas stream comprising substantially hydrocarbon-free air is well within regulated allowable emission levels and is exhausted into the environment.

It should be appreciated, however, that the adsorbent is only capable of adsorbing a certain amount of hydrocarbons before reaching capacity and becoming ineffective. Accordingly, the bed must be periodically regenerated to restore the carbon to a level where it will effectively adsorb hydrocarbons again. This regeneration of the adsorbent is a two step process.

The first step requires a reduction in the total pressure by pulling a vacuum on the bed that removes the largest amount of hydrocarbons. The second step is the addition of a purge air stream that passes through the bed. The purge air polishes the bed so as to remove substantially all of the previously adsorbed hydrocarbons. These hydrocarbons are then pumped to an absorber tower wherein lean oil or other nonvolatile liquid solvent is provided in a countercurrent flow relative to the hydrocarbon rich air-hydrocarbon mixture being pumped from the bed. The liquid solvent condenses and removes the vast majority of the hydrocarbons from that mixture and the residue gas stream from the absorber tower is recycled to a second bed of adsorbent while the first bed completes regeneration.

Up to the present date, cryogenic vapor recovery systems and adsorption/absorption vapor recovery systems have largely been independent technologies offered by different companies competing for a share of the vapor recovery system market. Little has been done to combine these technologies. Further, those efforts to combine the technologies have not achieved the most beneficial result.

For example, in U.S. Pat. No. 4,343,629 to Dinsmore et al, a cooling medium is circulated through heat transfer coils in the adsorbent beds. This is done to prevent the beds from overheating due to side exothermic reactions of hydrocarbons and/or impurities contained in the air-hydrocarbon vapor mixture with air and/or the solid adsorbent. While such an approach improves the efficiency of adsorption of hydrocarbons by the bed through the provision of lower operating temperatures, this approach fails to address other important issues. For example, high levels of moisture and oxygenates such as alcohol in the air-hydrocarbon vapor mixture and heavy hydrocarbons from distillates reach and contact the adsorbent bed adversely affecting adsorption efficiencies and shortening the service life of the bed.

In U.S. Pat. No. 4,480,393 to Flink et al, refrigeration condensation is utilized to recover the liquid hydrocarbons during regeneration of the bed. Once again, however, it should be appreciated that this approach allows the full level of moisture and oxygenates in the original air-hydrocarbon vapor mixture as well as heavy hydrocarbons to reach and contact the bed. Thus, as discussed above, the adsorption efficiency and the functional life of the bed are both significantly reduced to the detriment of the operator. Accordingly, it should be appreciated that a need is identified for an improved vapor recovery system that takes full advantage of a combination of cryogenic and adsorbent/absorbent vapor recovery system technologies.

SUMMARY OF THE INVENTION

Accordingly, it is a primary object of the present invention to provide a process and apparatus for the recovery of volatile liquids from an air-volatile liquid vapor mixture overcoming the above-described limitations and disadvantages of the prior art.

Another object of the present invention is to provide a process and apparatus for the recovery of volatile liquids from an air-volatile liquid vapor mixture wherein significant increases in through-put capacity are provided while maintaining full vapor removal efficiency. Advantageously, this is accomplished without increasing the size of the adsorbent beds and without any substantial increases in the capital cost of the equipment.

Still another object of the present invention is to provide an improved process and apparatus for recovering volatile liquid vapors and particularly hydrocarbons from air-hydrocarbon vapor mixtures wherein the mixtures are essentially cooled to remove moisture, oxygenates and heavy hydrocarbons from the mixture prior to introducing the mixture to a bed of adsorbent. Advantageously, the reduction in moisture and heavy hydrocarbons serves to maintain the pores of the adsorbent open for better efficiency when adsorbing hydrocarbons. Further, the initial cooling treatment condenses heavy volatile compounds that would otherwise lacquer the adsorbent in the beds thereby causing temperature excursions and significantly reducing the operating efficiency and the adsorbing activity of the adsorbents by about 3% per year. This cooling also serves to directly chill the adsorbent beds thereby increasing the efficiency of the adsorbent.

Yet another object of the invention is to allow the bypass of the condensing circuit when initially regenerating a bed of adsorbent so as to increase overall system efficiency. Further, this advantageous result is accomplished while also adsorbing any low level concentration of volatile liquid vapor from the air being initially drawn from the bed thereby minimizing undesirable emissions.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved process and apparatus are provided for recovering volatile liquid vapors from an air-volatile liquid vapor mixture such as expelled from a vessel adapted for holding volatile liquid during breathing, loading or refilling of that vessel. Specifically, the process includes collecting and delivering the air-volatile liquid vapor mixture expelled from the vessel to a storage tank such as a bladder tank. Advantageously, the bladder tank functions to temporarily store the air-volatile liquid vapor mixture prior to processing. This is necessary during peak loading periods as the air-volatile liquid vapor mixture is produced at a relatively high rate; that is, a rate often faster than it may be economically processed.

Next is the feeding of the air-volatile liquid vapor mixture from the bladder tank to a cooler at a predetermined rate of flow. The flow rate selected is one at which the cooler is capable of operating to efficiently cool the air-volatile liquid vapor mixture to a sufficiently low temperature to allow the desired condensation. More specifically, the cooling of the air-volatile liquid vapor mixture condenses volatile liquid vapor and moisture from the mixture. Preferably, the mixture is cooled to at least $-10°$ F. and preferably to at least $-30°$ F. During cooling, as much as 50% of the volatile liquid vapor and even a higher percentage of the moisture in the air-volatile liquid vapor mixture is condensed. That which is condensed is used for recuperative heat recovery elsewhere in the process or collected and either returned to the volatile liquid from which it vaporized or stored for further processing when appropriate to meet the operator's needs.

Next, is the circulating of the cooled and dehumidified air-volatile liquid vapor mixture through a first bed of adsorbent having an affinity for the volatile liquid whereby the volatile liquid is adsorbed on the first bed and substantially volatile liquid-free air is exhausted as a residue gas stream into the environment. It is the intent of this invention to have the cooled vapor mixture lower the temperature of the bed so as to effectively aid the adsorption process. This step is then followed by the desorbing and recovering of the volatile liquid from the bed.

This desorbing is accomplished by initially pulling a vacuum to draw air with a relatively low concentration of volatile liquid vapor from the first bed. Next is the adsorbing of the relatively low concentration of volatile liquid vapor on a second bed of adsorbent. Upon reaching a first vacuum level of, for example, 15 to 22 inches of mercury vacuum, there follows the drawing of air with a relatively high concentration of volatile liquid vapor from the first bed. Next is the condensing and recovering of the relatively high concentration of volatile liquid vapor from the air. Toward the end of this regeneration step a purge gas stream may be admitted to the first bed of adsorbent to aid in removing the last portions of the volatile liquid and regenerate the first bed more completely.

The mixture drawn from the first bed during regeneration at a vacuum level of, for example, 22–28 inches of mercury vacuum comprises air heavily laden with volatile liquid vapor (approximately 90% vapor by volume). This concentrated mixture may be fed directly back to the cooler where the majority of the volatile liquid vapor condenses and is recovered. Alternatively, the mixture may first be directed to an absorber tower.

As is known in the art such an absorber tower has a countercurrent flow of lean oil that condenses and removes the volatile liquid vapor from the mixture. The residue air stream resulting after passage through the absorber tower is only partially contaminated with volatile liquid. This residue air stream is, however, recirculated for passage through the cooler and then the second adsorbent bed to insure maximum volatile liquid vapor recovery efficiency. The cycle may then be repeated with the first and second reaction vessels reversing positions in the circuit.

In accordance with yet another aspect of the present invention, an apparatus for recovering volatile liquid vapor from the air-volatile liquid vapor mixture comprises a bladder tank for temporarily storing any air-volatile liquid vapor mixture that is released and requires processing.

The apparatus also includes a refrigeration unit including refrigerant circulating through a compressor, a condenser and an evaporator. In one embodiment, the cold refrigerant is supplied directly to a heat transfer coil (e.g. evaporator) within a cooler that is provided for cooling the air-volatile liquid vapor mixture so as to condense volatile liquid vapor and moisture from the mixture. In a second, alternative embodiment, the cold refrigerant is supplied directly to a heat transfer coil (e.g. evaporator) within a brine tank. The tank includes a sufficient quantity of brine to store enough cooling to allow approximately one to four hours of air-volatile liquid vapor mixture processing; the cold brine being circulated through a heat transfer coil in the cooler to condense and dehumidify the mixture as already described. In either embodiment, the refrigeration unit and cooler may be retrofitted to existing adsorption/absorption vapor recovery systems in the field to enhance their efficiency and performance.

In any embodiment, the invention includes means for feeding the air-volatile liquid vapor mixture from the bladder tank to the cooler at a rate of flow adapted to allow the necessary cooling to condense as much as half of the vapor and even more of the moisture in the mixture. Subsequent to this cooling and dehumidification the mixture is circulated by means of a first valve bank and conduit system through a first reaction vessel including a first bed of adsorbent having an affinity for the volatile liquid. During passage through the first bed the volatile liquid is adsorbed on the first bed while the first bed remains cool and substantially volatile liquid-free air is exhausted or vented into the environment. Advantageously, the resulting cooler bed temperatures increase the capture efficiency of the first bed and, therefore, the hydrocarbon capacity of the first bed. Thus, each process cycle is more productive.

As the first bed approaches its adsorbance capacity, the flow of air-volatile liquid vapor mixture to the first bed is terminated and the vent to the environment is closed. The flow of the air-volatile liquid vapor mixture is now directed to the second reaction vessel. These two reaction vessels alternate on a time basis (or percent remaining capacity basis) in order to process all of the required air-volatile liquid vapor flow. A second valve bank and conduit system is then used to place the first reaction vessel in communication with a pump and the pump is then actuated to draw a vacuum on the first bed. As this is done, the air initially drawn from the first bed includes a relatively low concentration of volatile liquid vapor. This mixture is passed by means of a third valve bank and conduit system to the first valve bank by which the mixture is directed to a second reaction vessel including a second bed of adsorbent. There the low concentration of volatile liquid vapor is adsorbed and clean air is exhausted into the atmosphere.

As the vacuum in the first reaction vessel deepens to a level of approximately 15-22 inches of mercury vacuum, more of the captured volatile liquid vapor is released from the first bed. Thus, a mixture including air and a relatively high concentration of volatile liquid vapor is produced. The third valve bank and conduit system is then utilized to direct this mixture laden with a high concentration of volatile liquid vapor from the first bed in the first reaction vessel to the cooler. There the mixture is cooled to condense and recover the volatile liquid vapor. The air stream may then be routed via the first valve bank and conduit system through the second reaction vessel and bed of adsorbent to capture any residual volatile liquid vapor before being exhausted into the atmosphere.

Alternatively, the air, heavily laden with the volatile liquid vapor released from the first bed may first be directed to an absorber tower and then to the cooler through a fourth valve bank and conduit system. As described above, the absorber tower has a countercurrent flow of solvent to remove volatile liquid from the mixture being circulated through the apparatus. The valve and conduit systems interconnect the various components of the apparatus so as to form an essentially sealed system.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1b is a schematical diagram representing an alternative embodiment to that shown in FIG. 1a; and FIG. 2 is a schematical diagram of an alternative cooling system to that disclosed in either of FIGS. 1a and 1b.

Reference will now be made in detail to the present preferred embodiment of the invention, an example of which is illustrated in the accompanying drawing.

DETAILED DESCRIPTION OF THE INVENTION

Figure 1A:
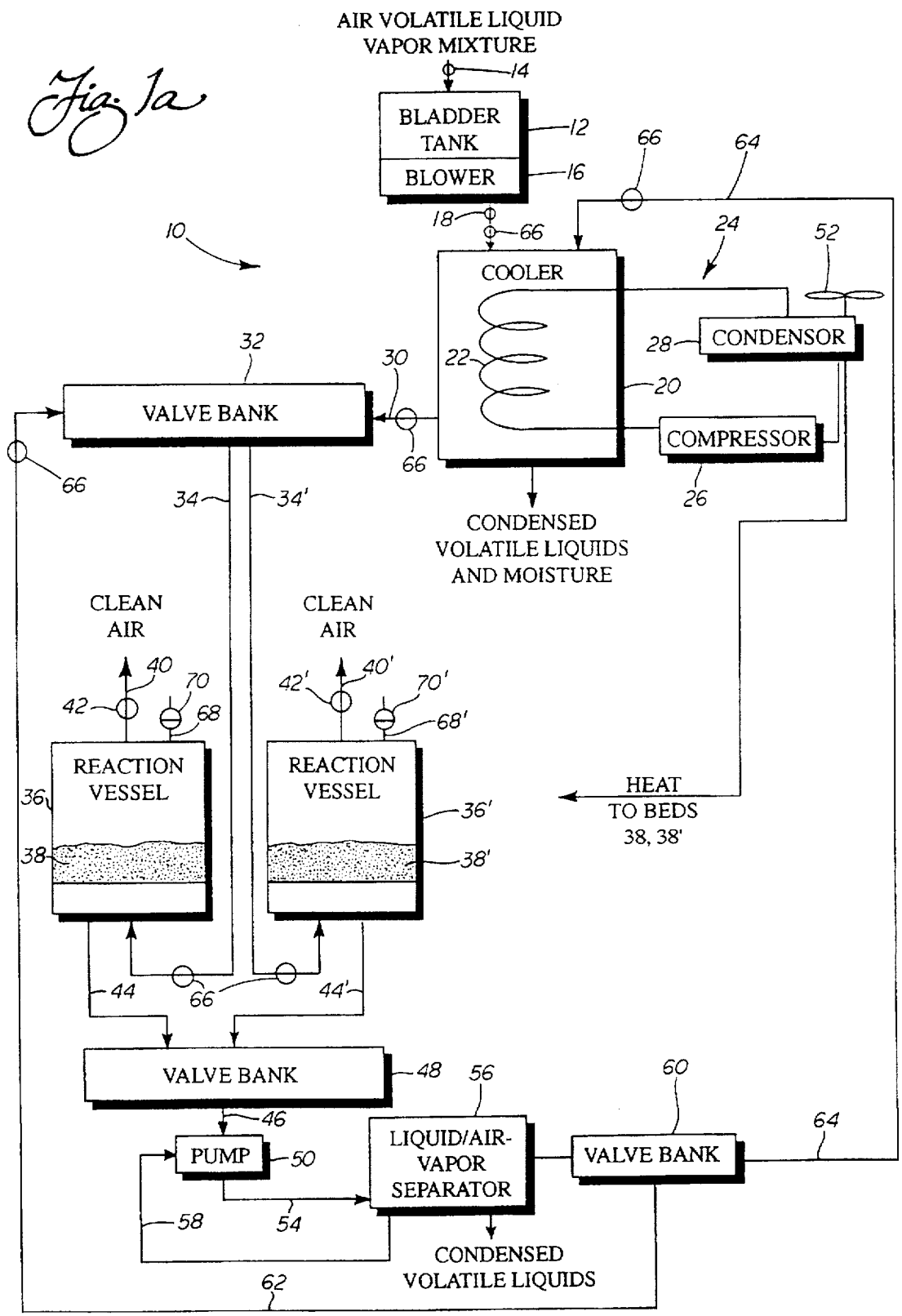
FIG. 1a is a schematical diagram representing one embodiment of the apparatus and illustrating the process of the present invention.

Reference is now made to FIG. 1a showing the apparatus 10 of the present invention for recovering volatile liquid vapor and, more particularly, hydrocarbon vapor (eg. gasoline vapor) from an air-volatile liquid vapor mixture. The apparatus 10 includes a storage tank, such as a bladder tank 12 for receiving an air-volatile liquid vapor mixture of a type expelled from a vessel (not shown) during breathing, loading or refilling of that vessel. Advantageously, the bladder tank 12 functions as a temporary storage facility during, for example, peak vessel loading periods when the air-volatile liquid vapor mixture is being produced at a rate greater than the processing speed of the apparatus 10.

More specifically, as the vessel is being filled, the air-volatile liquid vapor mixture is displaced from the vessel through a line leading to the bladder tank 12. The bladder tank 12 is configured and constructed to go from empty to full with nominal back pressure; that is, the volume of the bladder tank is increased as it fills in order to accommodate the air-volatile liquid vapor mixture displaced from the vessel. A one-way valve 14 prevents any flow in the reverse direction from the bladder tank 12 to the vessel.

The outlet of the bladder tank 12 is connected to a blower 16 that draws the air-volatile liquid vapor mixture from the bladder tank for processing. The air-volatile liquid vapor mixture is fed by the blower 16 through a metering valve 18 to a cooler 20 at the desired rate of flow to allow efficient processing. Specifically, the desired or predetermined rate of flow may be between, for example, 10 and 3000 scfm and more preferably, between 150–1000 scfm. Preferably, the bladder tank 12 is sized to store between 1–4 hours of throughput. At this rate of flow, the bladder tank 12 should have a capacity of at least between 90,000–360,000 gals.

The cooler 20 cools the air-volatile liquid vapor mixture to a temperature of at least $-10°$ F. and more preferably to a temperature of at least $-30°$ F. As shown, cooler 20 includes a heat transfer coil 22 (evaporator) operatively connected to a refrigeration unit 24 including a compressor 26 and a condenser 28. A refrigerant (eg. HP80, HP62, R22, R502 Freon) is circulated through the refrigeration unit 24 including the heat transfer coil 22 to cool the air-volatile liquid vapor mixture to a temperature sufficiently low to cause as much as 50% of the volatile liquid vapor to condense.

The condensed volatile liquids including hydrocarbons, oxygenates such as alcohol, and water are removed from the bottom of the cooler 20. They may be returned directly to the source from which the volatile liquid vaporized, be further used for heat recovery or processed and separated depending upon the particular application for the present invention. In order to provide the necessary cooling of the air-volatile liquid vapor mixture to a temperature of −10° F. to −30° F. while maintaining a flow rate of 150 to 1000 scfm, the refrigeration unit 24 is of a system size of between approximately 1–50 and more preferably 7–25 tons.

The now cooled and dehumidified air-volatile liquid vapor mixture is then circulated via a first conduit 30 to a first valve bank 32 from which it may be directed via lines 34, 34' to either of two identical reaction vessels 36, 36'. Each reaction vessel 36, 36' includes a bed of adsorbent 38, 38' respectively, having an affinity for the volatile liquid being handled by the system. As this description proceeds it will become apparent that the two beds 38, 38' allow the process to continue without interruption: that is, as one bed is being used to adsorb volatile liquid vapor, the other bed is being regenerated. The beds 38, 38' are simply alternated back-and-forth between adsorbtion and regeneration cycles as required to provide efficient processing.

The adsorbents that may be utilized in the beds 38, 38' are well known in the art and may, for example, include silica gel, certain forms of porous minerals such as alumina or magnesia, and most preferably, activated charcoal. As the air-volatile liquid vapor mixture passes through, for example the bed 38 in reaction vessel 36, that bed is maintained at a relatively cooler temperature, volatile liquids (eg. hydrocarbons) are adsorbed and substantially hydrocarbon-free air is exhausted into the environment through exhaust line 40.

Of course, it should be appreciated that the bed 38 of adsorbent is only capable of adsorbing a certain amount of hydrocarbons before it reaches its capacity and becomes ineffective. Accordingly, the bed 38 must be periodically regenerated by means of releasing the previously adsorbed hydrocarbons. This is accomplished by terminating the flow of air-volatile liquid vapor mixture to the bed 38. This may be done by operation of the first valve bank 32 which closes off flow into the line 34 leading to the reaction vessel 36.

Next the output line 44 is connected in fluid communication with a pump feed line 46 through operation of a second valve bank 48. The line 46 feeds a vacuum pump 50 used in bed regeneration. For purposes of regeneration, the pump 50 is operated to pull a vacuum on the reaction vessel 36 and bed 38. The fan 52 is also operated to provide a flow of air over the condenser 28 of the refrigeration unit 24. As a result, that air is heated. That heated air may be utilized to warm the bed 38 during the regeneration process thereby enhancing the release of the previously absorbed hydrocarbons. Alternatively, heat may be provided to the bed 38 during this portion of the process by circulating hot refrigerant from the compressor 26 directly through a heat transfer conduit in the bed (not shown).

As the pump 50 initially draws the vacuum down in the reaction vessel 36, a mixture of air with a relatively low concentration of volatile liquid vapor is pulled from the bed 38. This mixture is directed by the pump 50 through conduits 44, 46 and 54 into the liquid/air vapor separator 56. The liquid/air-vapor separator 56 separates the pump sealing fluid (for recirculation to the pump 50 through line 58) from both condensed volatile liquids that are recovered and the air-vapor mixture which is selectively directed by the third valve bank 60 through conduit 62 to the reaction vessel 36' including the second bed of adsorbent 38' (via the first valve bank 32 and conduit or line 34').

This second reaction vessel 36' is provided in parallel with the first reaction vessel 36 in the valve bank and conduit systems. In the second reaction vessel 36' the relatively low concentration of volatile liquid vapor is adsorbed and captured in the bed 38' and clean air is exhausted into the environment through line 40' past valve 42'.

As the vacuum in the first reaction vessel 36 approaches a level of approximately 15–22 inches of mercury vacuum, a much greater quantity of previously adsorbed volatile liquid vapor is released from the first bed 38. Accordingly, the mixture drawn from the reaction vessel 36 by the pump 50 comprises air with a relatively high concentration of volatile liquid vapor. Thus, at a selected vacuum level (e.g. 15–22 inches of mercury vacuum) the third valve bank 60 is activated to direct the mixture along the conduit 64 past one way check valve 66 back to the cooler 20. There, sufficient cooling is provided to condense the majority of the now concentrated volatile liquid vapor in the air-volatile liquid vapor mixture thereby allowing for its recovery.

Next, the air is directed from the cooler 20 through the line or conduit 30 to the first valve bank 32. From there, the air is now directed through line 34' to reaction vessel 36' where any residual volatile liquid vapor is adsorbed in the bed 38' before the resulting clean air is exhausted through line 40' past valve 42'.

Toward the end of the regeneration cycle (eg. when a specific second or higher vacuum level is reached or for a specific time such as the last one to two minutes of an approximately 10–17 minute cycle), a small quantity of purge air is introduced into the reaction vessel 36. This purge air is drawn from the ambient atmosphere through line 68 and flow control valve 70 and is passed through the first bed 36 polishing the adsorbent clean of the remaining hydrocarbons. This purge air may be heated using heat recovery from the refrigeration circuit (e.g. condenser 28).

Advantageously, the heated purge air increases the removal of the previously trapped hydrocarbons from the bed 38 of adsorbent. During this process it should be appreciated that the purge air is only introduced into the reaction vessel 36 at a rate sufficient to substantially maintain a pressure of approximately 22–28 and more preferably 25–27 inches of mercury vacuum. The purge air and the last of the hydrocarbons are also directed by the pump 50 through the separator 56 and past valve bank 60 along conduit 54 and 64 back to the cooler 20 where the remaining hydrocarbons are recovered.

At the end of the regeneration cycle for the first bed 38 in reaction vessel 36, the system is switched over to regenerate the bed 38' in reaction vessel 36'. This is accomplished in the same manner just described. The use/operation of the two beds 38, 38' is simply reversed.

Specifically, valve bank 48 is now activated so that the pump 50 draws a vacuum on the reaction vessel 36' through conduits 44' and 46. Initially, the air with a relatively low concentration of volatile liquid vapor is directed by operation of the valve banks 60 and 32 through conduits 54, 62 and 34 to the reaction vessel 36. There volatile liquid vapor is absorbed and clean air is exhausted. At the predetermined vacuum level, valve bank 60 is switched to direct the air with a relatively high concentration of volatile liquid vapor back along conduit 64 to the cooler 20. Most of the volatile liquid vapor is condensed and then collected from the cooler 20. The air is directed through the output conduit 30 of the cooler 20 to the valve bank 32. From there the air is directed through the bed 38 in reaction vessel 36 to capture any residual volatile liquid vapor and exhaust clean air through line 40 past valve 42. This cycling of the reaction vessels 36, 36' and beds 38, 38' may continue indefinitely while also processing the mixture from the bladder tank 12 to allow substantially continuous operation.

Figure 1B:
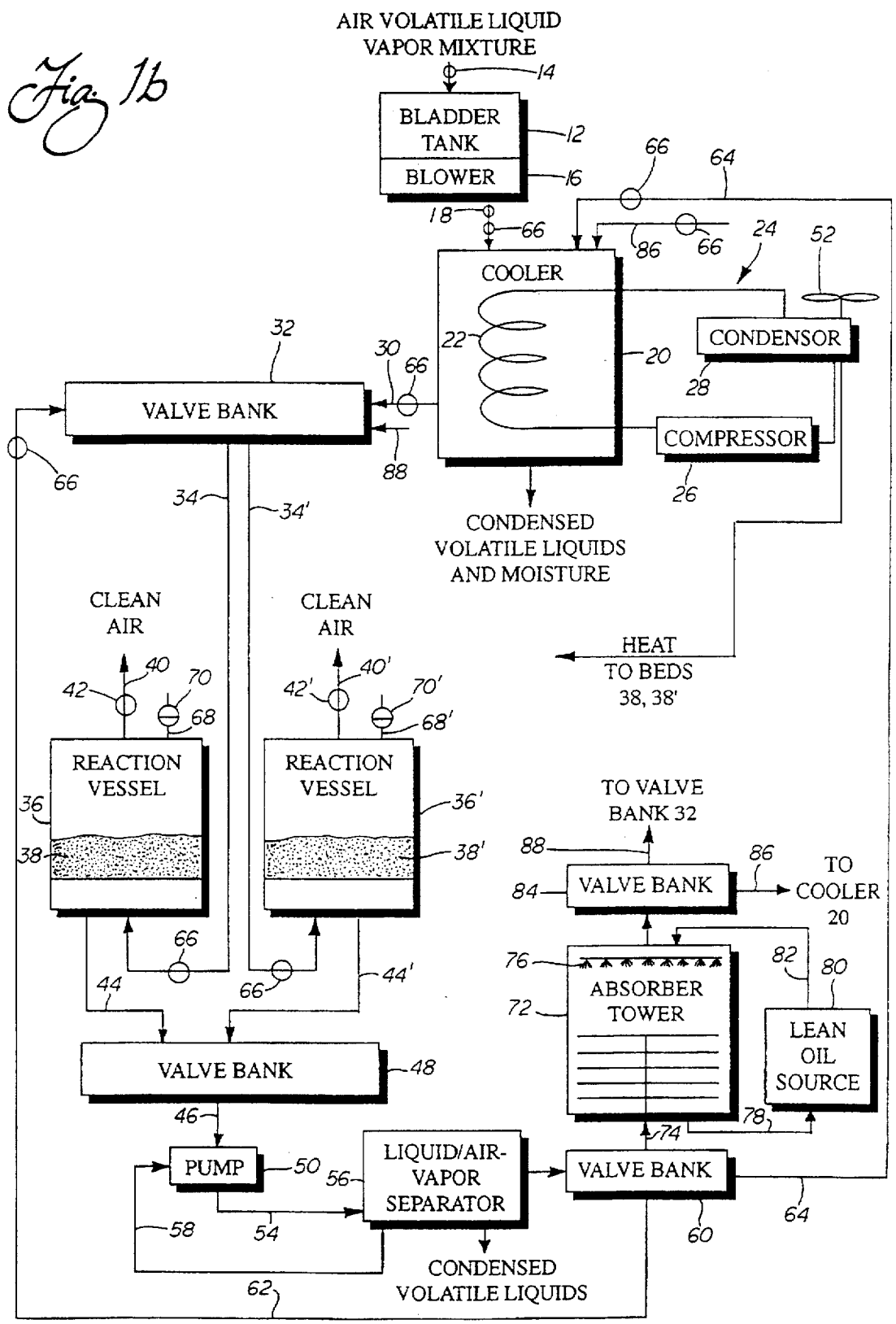

An alternative embodiment of the present invention is shown in FIG. 1b. This embodiment includes a bladder tank 12, cooler 20, refrigeration unit 24, reaction vessels 36, 36', pump 50, liquid/air-vapor separator 56 and associated valve bank and conduit components identical to the system already described with reference to FIG. 1a. Accordingly, the same reference numerals have been used to identify equivalent components.

In contrast to the first embodiment, however, this second embodiment also includes an absorber tower 72 that may be used to recover the concentrated volatile liquid vapor from the air-volatile liquid vapor mixture passing through the valve bank 60 from the liquid/air-vapor separator through line 74. This occurs when the vacuum level in the first reaction vessel 36 reaches the point (e.g. 15-22 inches of mercury vacuum) of switch-over of valve bank 60 to direct flow away from the reaction vessel 36'. Absorber tower 72 provides a countercurrent flow of solvent such as lean oil by means of the dispersal sprayer 76. The lean oil serves to condense the volatile liquids from the air-volatile liquid vapor mixture (now heavily laden with about 90% by volume hydrocarbons) drawn from the reaction vessel 36 by the pump 50.

The condensed hydrocarbons and lean oil are collected from the bottom of the absorber tower 72 and then delivered via conduit 78 to the source 80 in which the lean oil is stored. Lean oil is withdrawn from the source 80 by means of a pump (not shown) and delivered to the dispersal sprayer 76 of the absorber tower 72 through line 82 as required during processing.

The residue air that exits from the absorber tower 72 is largely free of volatile liquid vapor. It, however, is preferably recirculated or recycled for introduction into the cooler 20 by means of fourth valve bank 84 via the conduit 86 to recover any residual volatile liquid vapor by condensation and further reprocessing. During the cooler defrost cycle, however, or at other desired times flow from the absorber tower 72 may be piped (via valve bank 84 through line 88) directly to the bed 38' in reaction vessel 36', to complete the cleaning of the air prior to exhaust into the environment. Of course, during the next cycle, it is the bed 38' in reaction vessel 36' that is regenerated while the bed 38 in vessel 36 is used to adsorb residual volatile liquid vapor and finally clean the air.

As an alternative, the embodiment shown in FIG. 1b allows the mixture of air and high concentration of volatile liquid vapor to be immediately directed into the cooler 20 if desired by means of conduits 54, 64 via valve banks 48, 60. Thus, the embodiment shown in FIG. 1b allows the initial mixture (having a low concentration of volatile liquid vapor) drawn from the reaction vessel 36 to be directed through a second reaction vessel 36' and bed 38' for cleaning. Once the necessary vacuum level is reached in the first reaction vessel 36 to provide a mixture of air with a relatively high concentration of volatile liquid vapor, the mixture may be selectively directed through the various conduits 44, 46, 54 and 64 via valve banks 48, 60 or conduits 44, 46, 54, 74, 86 and/or 88 via valve banks 48, 60, 84 to the cooler 20 alone, the absorber tower 60 alone or both the absorber tower and cooler depending on operator preference and desired system performance characteristics. One-way flow valves 66 are provided as required to insure proper air flow direction through the apparatus 10 at all times. This provides a flexibility in performance heretofore unavailable in the art.

The embodiment shown in FIG. 1b also allows for utmost processing efficiency in view of, for example, temperature and pressure conditions and reaction vessel saturation conditions while minimizing cooler capacity requirements (e.g. eliminates flow through cooler at low concentrations of volatile liquid vapor that would otherwise result in inefficient cooling performance).

FIG. 2 shows yet another alternative embodiment. More specifically, the substitute refrigeration system 90 shown in FIG. 2 may be used in place of the refrigeration system 24 shown in FIGS. 1a and 1b.

The refrigeration system 90 includes a compressor 92, a condenser 94 and an evaporator 96 interconnected by a refrigerant line so as to form a refrigeration circuit. Refrigerant flowing through the refrigeration system 90 provides cooling at the evaporator 96 that is provided in heat exchange relationship with the brine in a brine tank 98. The cooled brine is stored in the brine tank 98 until needed for processing the air-volatile liquid vapor mixture that is passed through the cooler 20 (note coil 100 for circulating brine in heat exchange relationship with the air-volatile liquid vapor mixture).

Preferably, the brine tank 96 is of sufficient capacity to store one to four hours of the desired cooling at an air-volatile liquid vapor flow rate of from, for example, 150 to 1000 scfm. A brine tank 96 of approximately 2000 gallons or more may be utilized.

A number of substantial benefits are attained when utilizing the process and any embodiment of the apparatus of the present invention to recover volatile liquid vapors from an air-volatile liquid vapor mixture. First, it must be appreciated that moisture and also oxygenates such as alcohols in present day hydrocarbon fuels significantly adversely affect the adsorption efficiency, capacity and functional service life of the beds 38, 38' of adsorbent. More particularly, the moisture closes many of the pores of the adsorbent thereby preventing those pores from functioning to adsorb the desired hydrocarbons. This reduces both adsorption efficiency and capacity. Further, the oxygenates not only close pores but under certain conditions may chemically react with the adsorbent thereby rendering it inactive and/or causing chemical reactions resulting in extremely elevated temperatures that could become sufficiently high to force the apparatus to be shut down.

Second, heavier hydrocarbon contaminates in gasoline are present in small quantities. The initial cooling step advantageously removes the majority if not all of these heavier contaminants before the air-volatile liquid vapor mixture contacts the bed of adsorbent. As these heavier contaminants would otherwise serve to lacquer the adsorbent and reduce its efficiency by as much as 3% each year, the removal of these contaminants as provided for in the present invention significantly enhances the service life of the bed.

Third, as the cooler 20 effectively removes as much as 50% of the volatile liquid vapor from the mixture, the functional capacity of a bed of adsorbent of given size is effectively increased 100%. Hence, the cooler 20 effectively doubles the capacity of a standard adsorbent/absorbent vapor recovery system. Stated another way, the bed 38, 38' and other equipment may be reduced as much as 50% in capacity to effectively provide the same capacity of operation. Either circumstance represents a significant advantage and cost saving in capital outlay.

Fourth, as the air-volatile liquid vapor mixture is cooled to at least −10° F. and preferably −30° F. before reaching the bed 38, 38' of adsorbent, the bed operates at cooler temperatures thereby increasing adsorption efficiency.

Fifth, it should further be appreciated that the pump 50 utilized during the regeneration of the bed 36, 36' is typically a liquid ring vacuum pump. Such a pump requires a sealing fluid to operate. Usually, the fluid utilized is a commercial antifreeze; that is, an ethylene glycol based antifreeze and water mixture. In prior art processes and systems not incorporating the cooler 20 and cooling step for the dehumidification of the air-volatile liquid vapor mixture, both moisture and oxygenates in the mixture are passed into the pump during the regeneration cycle. These become mixed in and dilute the antifreeze in the pump reducing its effectiveness as a sealing fluid.

Accordingly, unless repeated periodic maintenance schedules are rigidly followed and the necessary down time is suffered to drain old and add new sealing fluid, an accelerated rate of rusting and scaling of the pump mechanism results. Over time this leads to a loss of vacuum pump efficiency which reduces the vacuum that may be pulled on the beds 38, 38' during regeneration. As a result, vapor recovery capacity of the system is also reduced. This represents a significant detriment to the operator. Further, in severe cases, the pump may even seize requiring replacement at substantial expense and loss of productivity. Of course, the relatively frequent disposal of "spent" ethylene glycol necessitated with prior art systems further represents a significant hazardous waste disposal problem that is significantly reduced as a result of the present invention.

Another prior art method to remove the contaminants from the sealing fluid is to heat the sealing fluid to boil off the oxygenates and moisture. The heated sealing fluid, however, has the unfortunate side effect of reducing the capacity of the pump. Further, some of the heat is transferred from the sealing fluid to the air and volatile liquid vapor mixture. As a result greater cooling is required to condense the volatile liquid vapor and system efficiency is adversely affected. This significant problem is avoided with the present process as no heating of the sealing fluid is necessary and, therefore pump capacity is enhanced along with system efficiency.

It should also be noted that the absorber tower 72 operates best at a pressure of substantially 5–10 psi. This positive pressure is typically achieved by restricting the flow of the air-volatile liquid vapor mixture through the tower 72. In order for the pump 50 to move the mixture effectively through the tower 72 at this positive pressure the pump must be continually maintained in peak operating condition. This is best accomplished by preventing contamination and dilution of the sealing fluid with water and oxygenates in the manner of the present invention as previously described.

Sixth, the present system allows unparalleled flexibility and choice of operation so that processing can be matched to system and environmental conditions to maximize performance efficiency. Specifically, temperatures, pressures and volatile liquid concentration levels may be monitored and the flow of the air and volatile liquid vapor mixture through the system controlled to optimize performance under substantially all operating conditions. At low volatile liquid vapor concentrations the mixture is directed to a second reaction vessel and second bed to provide clean air and reduce flow through the cooler. This advantageously results in a reduction in cooler capacity requirements while also increasing cooler recovery efficiency (i.e. the cold is not wasted). At higher volatile liquid vapor concentrations, the mixture may be directed through the cooler alone, the absorber tower alone or both the absorber tower and cooler depending upon which approach provides the best result.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

I claim:

1. A process for recovering volatile liquid vapors from an air-volatile liquid vapor mixture, comprising the steps of:

collecting the air-volatile liquid vapor in a bladder tank;

feeding the collected air-volatile liquid vapor mixture from said bladder tank to a cooler at a predetermine rate of flow;

cooling the air-volatile liquid vapor mixture to condense volatile liquid vapor and moisture from the air-volatile liquid vapor mixture;

collecting the condensed volatile liquid vapor and moisture;

circulating the cooled and dehumidified air-volatile liquid vapor mixture through a first bed of adsorbent having an affinity for the volatile liquid whereby volatile liquid is adsorbed on said first bed and a substantially volatile liquid vapor-free air stream is exhausted;

initially pulling a vacuum to draw air with a relatively low concentration of volatile liquid vapor from said first bed;

adsorbing the relatively low concentration of volatile liquid vapor on a second bed of adsorbent;

drawing air with a relatively high concentration of volatile liquid vapor from said first bed upon reaching a predetermined vacuum level;

condensing the volatile liquid vapor from the air with a relatively high concentration of volatile liquid vapor; and recovering the condensed volatile liquid vapor.

2. The process set forth in claim 1, wherein the air-volatile liquid vapor mixture is cooled to at least −10° F. during cooling before circulating through said bed.

3. The process set forth in claim 1, wherein the air-volatile liquid vapor mixture is cooled to at least −30° F. during cooling before circulating through said bed.

4. The process set forth in claim 1, wherein said predetermined rate of flow is between 10–3000 scfm and said predetermined vacuum level is substantially 15–22 inches of mercury vacuum.

5. The process set forth in claim 4, wherein said condensing is accomplished by directing the air with a relatively high concentration of volatile liquid vapor to said cooler.

6. The process set forth in claim 4, wherein said condensing is accomplished by directing the air with a relatively high concentration of volatile liquid vapor to an absorber tower.

7. The process set forth in claim 1, wherein said condensing is accomplished by selectively directing the air with a relatively high concentration of volatile liquid vapor to an absorber tower alone said cooler alone or said absorber tower and then said cooler.

8. The process set forth in claim 1, including passing a purge gas stream through said first bed when directing the air with a relatively high concentration of volatile liquid vapor through said absorber tower or said cooler whereby the steps of the process are repeated.

9. The process set forth in claim 1, including cooling said first bed during circulating and heating said first bed during pulling and drawing.

10. The process set forth in claim 4, including cooling said first bed during circulating and heating said first bed during pulling and drawing.

11. An apparatus for recovering volatile liquid vapor from an air-volatile liquid vapor mixture, comprising:
   a bladder tank for temporarily storing the air-volatile liquid vapor mixture prior to processing;
   a cooler for cooling the air-volatile liquid vapor mixture so as to condense volatile liquid vapor and moisture from the air-volatile liquid vapor mixture;
   a refrigeration unit for providing cooling to said cooler;
   means for feeding the air-volatile liquid vapor mixture from said bladder tank to said cooler at a predetermined rate of flow;
   a pair of reaction vessels, each reaction vessel including a bed of adsorbent having an affinity for the volatile liquid whereby volatile liquid is adsorbed on said bed and relatively volatile liquid vapor free air is produced;
   first valve and conduit means for selectively circulating the air-volatile liquid vapor mixture from said cooler to either of said reaction vessels;
   a pump;
   second valve and conduit means for selectively connecting said pump to either of said reaction vessels for drawing a vacuum on the bed in the connected reaction vessel so as to recover the previously adsorbed volatile liquid vapor now concentrated in air; and
   third valve and conduit means for selectively directing air with a relatively low concentration of volatile liquid vapor from one of said reaction vessels to another of said reaction vessels and air with a relatively high concentration of volatile liquid vapor from said one reaction vessel to said cooler.

12. The apparatus set forth in claim 11, further including an absorber tower for selectively removing volatile liquid vapor from the air-concentrated volatile liquid vapor mixture being drawn by said pump from the bed during regeneration of the bed and fourth valve and conduit means for selectively directing air from said absorber tower to one of said cooler and said second reaction vessel.

13. The apparatus set forth in claim 12, including means for recirculating air discharged from said absorber tower to said cooler.

14. The apparatus set forth in claim 11, including means for recovering heat from said refrigerant for selectively heating one of said beds of adsorbent whereby volatile liquid may be selectively desorbed and recovered.

15. The apparatus set forth in claim 11, further including a brine tank containing a brine solution, means for transferring heat between said brine solution and said refrigeration unit and means for circulating brine solution cooled by said refrigeration unit through said cooler to treat the air-volatile liquid vapor mixture.

16. A process for recovering volatile liquid vapors from an air volatile liquid vapor mixture, comprising the steps of:
   collecting and feeding the air-volatile liquid vapor mixture to a cooler at a predetermined rate of flow of between 10-3000 scfm;
   cooling the air-volatile liquid vapor mixture to at least $-10°$ F. so as to condense volatile liquid vapor and moisture from the air-volatile liquid vapor mixture;
   collecting the condensed volatile liquid vapor and moisture;
   circulating the cooled and dehumidified air-volatile liquid vapor mixture through a first bed of adsorbent having an affinity for the volatile liquid whereby volatile liquid is adsorbed on said first bed and a substantially volatile liquid vapor-free air stream is exhausted; and
   initially pulling a vacuum to draw air with a relatively low concentration of volatile liquid vapor from said first bed;
   adsorbing the relatively low concentration of volatile liquid vapor on a second bed of adsorbent;
   drawing air with a relatively high concentration of volatile liquid vapor from said first bed upon reaching a predetermined vacuum level;
   condensing volatile liquid vapor from the air with a relatively high concentration of volatile liquid vapor; and
   recovering the condensed volatile liquid vapor.

17. The process set forth in claim 16, wherein said condensing is accomplished by directing the air with a relatively high concentration of volatile liquid vapor to said cooler.

18. The process set forth in claim 16, wherein said condensing is accomplished by directing the air with a relatively high concentration of volatile liquid vapor to an absorber tower.

19. The process set forth in claim 16, wherein said condensing is accomplished by selectively directing the air with a relatively high concentration of volatile liquid vapor to an absorber tower alone said cooler alone or said absorber tower and then said cooler.

20. An apparatus for recovering volatile liquid vapor from an air-volatile liquid vapor mixture, comprising:
   a cooler for cooling the air-volatile liquid vapor mixture so as to condense volatile liquid vapor and moisture from the air-volatile liquid vapor mixture;
   a refrigeration unit for providing cooling to said cooler;
   means for feeding the air-volatile liquid vapor mixture to said cooler at a predetermined rate of flow of between 10-3000 scfm;
   a pair of reaction vessels, each vessel including a bed of adsorbent having an affinity for the volatile liquid whereby volatile liquid is adsorbed on said bed and relatively volatile liquid vapor free air is produced;
   first valve and conduit means for selectively circulating the air-volatile liquid vapor mixture from said cooler to either of said reaction vessels;
   a pump;
   second valve and conduit means for selectively connecting said pump to either of said reaction vessels for drawing a vacuum on the bed in the connected reaction vessel so as to recover the previously adsorbed volatile liquid vapor now concentrated in air; and third valve and conduit means for selectively directing air with a relatively low concentration of volatile liquid vapor from one of said reaction vessels to another of said reaction vessels and air with a relatively high concentration of volatile liquid vapor from said one reaction vessel to said cooler.

21. The apparatus set forth in claim 20, further including an absorber tower for selectively removing volatile liquid vapor from the air-concentrated volatile liquid vapor mixture being drawn by said pump from the bed during regeneration of the bed and fourth valve and conduit means for selectively directing air form said absorber tower to one of said cooler and said second reaction vessel.

22. The apparatus set forth in claim 21, including means for recirculating air discharged from said absorber tower to said cooler.

23. The apparatus set forth in claim 20, including means for recovering heat from said refrigerant for selectively heating one of said beds of adsorbent whereby volatile liquid may be selectively desorbed and recovered.

24. The apparatus set forth in claim 20, further including a brine tank containing a brine solution, means for transferring heat between said brine solution and said refrigeration unit and means for circulating brine solution cooled by said refrigeration unit through said cooler to treat the air-volatile liquid vapor mixture.

* * * * *